United States Patent [19]

Mori

[11] Patent Number: 4,669,817

[45] Date of Patent: Jun. 2, 1987

[54] APPARATUS FOR TIME-SHARING LIGHT DISTRIBUTION

[76] Inventor: Kei Mori, 3-16-3-501, Kaminoge, Setagaya-ku, Tokyo, Japan

[21] Appl. No.: 575,415

[22] Filed: Jan. 31, 1984

[30] Foreign Application Priority Data

| Feb. 4, 1983 | [JP] | Japan | 58-17180 |
| Feb. 10, 1983 | [JP] | Japan | 58-21040 |
| Feb. 10, 1983 | [JP] | Japan | 58-21041 |

[51] Int. Cl.⁴ .................... G02B 6/26; F21V 7/04
[52] U.S. Cl. ................ 350/96.15; 350/96.10; 350/96.19; 350/96.20; 350/96.24; 350/258; 350/259; 362/32; 362/35; 362/805
[58] Field of Search ............ 372/68, 97; 350/258, 350/259, 260, 261, 262, 319; 362/375; 47/1.4

[56] References Cited

U.S. PATENT DOCUMENTS

| 2,909,857 | 10/1959 | Wilson | 350/96.10 |
| 3,240,106 | 3/1966 | Hicks | 350/96.20 |
| 3,275,815 | 9/1966 | Petroff et al. | 362/32 |
| 3,411,011 | 11/1968 | Genahr et al. | 350/96.24 |
| 3,413,067 | 11/1968 | Froio | 350/96.10 |
| 3,932,926 | 1/1976 | Dotsko | 350/96.24 X |
| 4,057,719 | 11/1977 | Lewis | 350/96.20 |
| 4,129,372 | 12/1978 | Allgeier | 350/96.10 |
| 4,352,550 | 10/1982 | Uchida | 350/96.24 |
| 4,576,436 | 3/1986 | Daniel | 350/96.10 |
| 4,585,298 | 4/1986 | Mori | 350/96.10 |

FOREIGN PATENT DOCUMENTS

| 1161826 | 1/1964 | Fed. Rep. of Germany | 350/96.10 |
| 56-19001 | 2/1981 | Japan | 350/96.15 |
| 57-30811 | 2/1982 | Japan | 350/96.15 |
| 57-85687 | 5/1982 | Japan | 350/96.10 |
| 59-125822 | 7/1984 | Japan | 350/96.10 |
| 2059621 | 4/1981 | United Kingdom | 350/96.19 |

OTHER PUBLICATIONS

Fredrickson et al, "Utilization of the Effects of Intermittent Illumination . . . " Pro. of the IBP/PP Tech. Meeting, trebon 9/69 pp. 519-541.
Edwards, "Optics for Natural Lighting" NASA Tech. Briefs Summer 1978 pp. 209-211.

*Primary Examiner*—William L. Sikes
*Assistant Examiner*—Brian M. Healy
*Attorney, Agent, or Firm*—Jordan and Hamburg

[57] ABSTRACT

A time-sharing light distribution apparatus steers optical energy conducted thereto from a single source of optical energy supply to a plurality of remote locations or directly to the ambience. A light conducting rod receiving the optical energy at one end thereof includes an inclined surface for reflecting the optical energy to the ambience or to branch light conduction paths. A motor or like drive causes the light conducting rod to pivot or rotate about an axis thereof, thereby distributing the optical energy for desired applications such as photosynthesis.

21 Claims, 25 Drawing Figures

APPARATUS FOR TIME-SHARING LIGHT DISTRIBUTION

BACKGROUND OF THE INVENTION

The present invention relates to an apparatus for distributing light, or optical energy, which propagates through an elongate light conducting element on a time-sharing basis, or alternately, to desired locations.

Various attempts have been made to implement lighting and other purposes by converging solar energy or artificial optical energy into a light conducting element through a lens or the like so that the converged energy may propagate therethrough to a desired location. The optical energy transmitted by the light conducting element may serve as a light source for photosynthetic reactions of, for example, chlorella or for forcing culture of tomato or the like, as has also been proposed in various forms.

Concerning cultivation of chlorella or like substance, a single photosynthetic reaction requires light only for about 100 microseconds and does not require it for the remaining 10 milliseconds or so, that is, the reaction proceeding for the latter period is a dark reaction (thermochemical reaction) which does not need any light. For the period of 10 milliseconds, photosynthesis proceeds more effectively when light is not supplied than when it is supplied. Also, intermittent supply of optical energy is rather favorable for ordinary plants in promoting effective transfer of the photosynthetic substances within the plants. Such advantages attainable with intermittent supply of optical energy energy are disclosed in my Japanese patent application Nos. 57-17238 and 57-224150 which corresponds to Kokai Nos. 85926 and 125822/84, respectively, for example. It is also known that even the human eyes do not need continuous supply of optical energy because they retain an afterimage for a certain period of time after the cut-off of light supply.

It will be understood from the above that desired effects are sufficiently achievable if the supply of optical energy is not continuous, and continuous supply of light is rather undesirable for some applications. It is almost impossible, however, to attain a light source capable of building up and falling quick enough for the supply of optical energy whose intervals are quite short; if not impossible, such a light source would bring about various problems from the standpoint of costs, service life, etc.

Meanwhile, where optical energy is to be repeatedly turned on and off with predetermined intervals and a wide area or a plurality of locations are to be illuminated, a plurality of light sources have to be employed in a general sense and turned on and off individually. This would result in a significant number of light sources and, therefore, prohibitive costs and maintenance work.

SUMMARY OF THE INVENTION

It is therefore an object of the present invention to provide a light distribution apparatus which is capable of effectively distributing optical energy from a light conducting member to any number of locations on a time-sharing basis.

It is another object of the present invention to provide a light distribution apparatus which is economical to produce and easy to maintain.

It is another object of the present invention to provide a generally improved apparatus for timesharing light distribution.

In accordance with one aspect of the present invention, there is provided an apparatus for distributing optical energy supplied from a single source of optical energy supply to a plurality of locations on a time-sharing basis, comprising a cylindrical light conducting rod for receiving the optical energy at one end thereof and inclined at the other end with respect to a plane perpendicular to an axis of the rod to reflect the optical energy perpendicularly to the axis along which the optical energy propagates, a drive device for driving the light conducting rod in an angular movement about an axis thereof, and a plurality of light conduction paths each extending to any of the locations perpendicularly to the axis of the light conducting rod and located to receive at one end thereof the optical energy which is reflected by the other end of the light conducting rod.

In accordance with another aspect of the present invention, there is provided an apparatus for distributing optical energy supplied from a single source of optical energy supply to a plurality of locations on a time-sharing basis, comprising a light conducting rod for receiving the optical energy at one end thereof and inclined at the other end to reflect the optical energy, and a drive device for causing the light conducting rod to rotate about an axis thereof, the other or inclined end of the light conducting rod comprising a plurality of contiguous surfaces which are different in inclination angle from each other.

In accordance with another aspect of the present invention, there is provided an apparatus for distributing optical energy supplied from a single source of optical energy supply to a plurality of locations on a time-sharing basis, comprising a cylindrical light conducting rod assembly for receiving the optical energy at one end thereof and having a mirror mounted at the other end to reflect the optical energy, and a drive device for rotating the light conducting rod assembly about an axis thereof, the light conducting rod assembly comprising a plurality of rods which are connected end-to-end with each other, adjacent ones of the rods defining a light diffusing chamber at an interface thereof.

The above and other objects, features and advantages of the present invention will become more apparent from the following detailed description taken with the accompanying drawing.

DESCRIPTION OF THE PREFERRED EMBODIMENTS

While the apparatus for time-sharing light distribution of the present invention is susceptible of numerous physical embodiments, depending upon the environment and requirements of use, substantial numbers of the herein shown and described embodiments have been made, tested and used, and all have performed in an eminently satisfactory manner.

Figure 1:
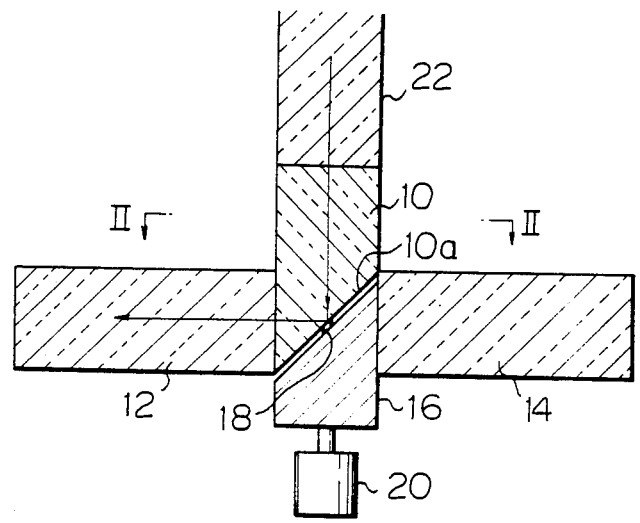
FIG. 1 is a sectional view of a light distribution apparatus embodying the present invention and taken along line I—I of FIG. 2.
Figure 2:
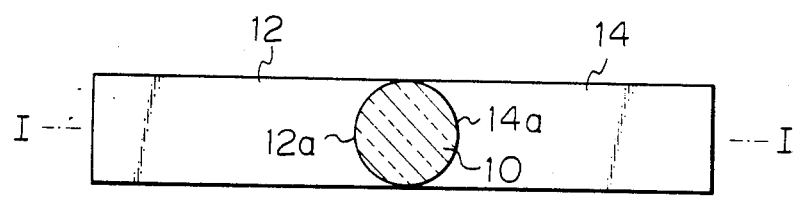
FIG. 2 is a partly sectional plan view of the apparatus of FIG. 1 as seen in a direction II—II of FIG. 1.

Referring to FIGS. 1 and 2 of the drawing, an apparatus embodying the present invention is shown and includes a cylindrical light conducting rod 10 and a pair of light conduction paths, or second light conducting rods, 12 and 14. The light conducting rod 10 is rigidly connected to a guide block 16 by a connecting member 18 which terminates at a drive unit 20. The rod 10 may be designed to continuously rotate in a predetermined direction or to reciprocally pivot in opposite directions about its axis. The drive unit 20 may comprise a motor for the rotation in a predetermined direction, and a motor or a solenoid for the pivotal movement in opposite directions.

A light conducting cable 22 extends from the upper end of the rod 10 to a location where an arrangement for converging either sunlight or artificial light (not shown) is positioned. Thus, the converged light or optical energy propagating through the cable 22 is introduced into the rod 10 of the light distributor.

The rod 10 is rotatably connected to the cable 22 through optical oil or the like and driven by the drive unit 20 in the previously described manner. The lower end of the rod 10 is inclined to form a reflecting surface 10a so that the optical energy L propagating through the cable 22 and rod 10 may be reflected by the surface 10a perpendicularly to the axis of the rod 10.

The light conduction paths 12 and 14 extend radially outwardly away from each other at the level of the inclined reflecting end 10a of the rod 10 and perpendicularly to the axis of the rod 10.

In the illustrated position the inclined reflecting end 10a of the rod 10 steers the optical energy L only to the rod 12 and not to the other rod 14. When the rod 10 is moved 180 degrees about its axis by the drive unit 20 from the illustrated position, the optical energy L will be routed only to the rod 14. In this manner, rotating the rod 10 or pivoting it over each 180 degrees allows the optical energy L introduced into the rod 10 to be distributed to the opposite light conduction paths 12 and 14 on a time-sharing basis, or discontinuously. The rotation speed or the pivotting period of the drive unit 20 is variable to vary the period of radiation of the optical energy from the light conduction paths 12 and 14 as desired. That is, the rotation speed or the pivotting period of the drive unit 20 may be predetermined in conformity to an application of the optical energy emanating from the light conduction paths 12 and 14 such as cultivation of chlorella, lighting, or forcing culture of plants.

In the light distributor described above, facing ends 12a and 14a of the second light conducting rods 12 and 14 are shaped to define a through bore through which the rod 10 extends. This insures stable angular movement of the rod 10 in the bore while allowing a minimum of loss due to leakage of light to occur. The apparatus shown in FIGS. 1 and 2 is especially suitable for the forcing culture of plants in view of the fact that the optical energy steered by the rod end 10a is efficiently introduced into the light conduction path 12 or 14 only when the former faces the latter. In such an application, the rod 10 may be rotated such that the inclined end 10a moves in a reciprocal movement to alternately face the paths 12 and 14 once for every two hours, for example.

Figure 3:
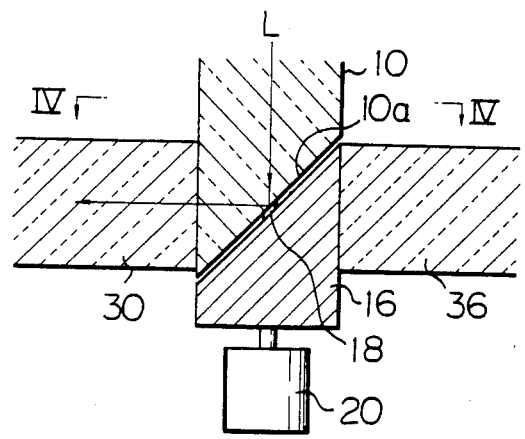
FIG. 3 is a fragmentary section of another embodiment of the present invention taken along line III—III of FIG. 1.
Figure 4:
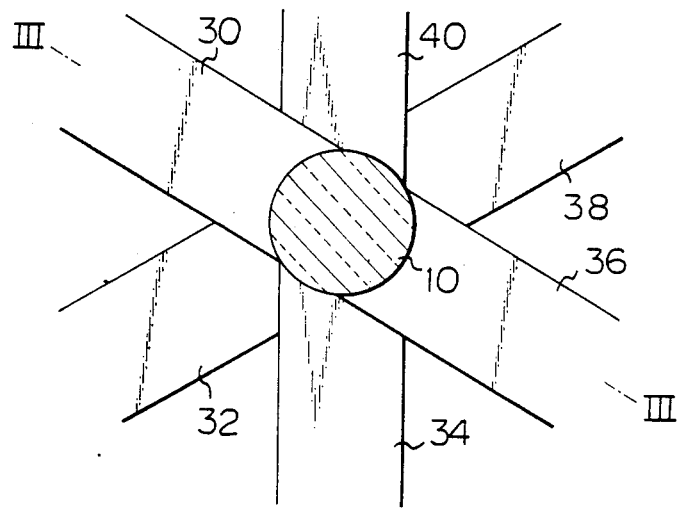
FIG. 4 is a partly sectional plan view of the apparatus of FIG. 3 as seen in a direction IV—IV of FIG. 3.

Referring to FIGS. 3 and 4, another embodiment of the present invention is shown which eliminates the above-described limitation concerned with the application. In these drawing, the same structural elements as those of FIGS. 1 and 2 are designated by the same reference numerals. The light distributor employs and effectively combines six light conducting rods 30, 32, 34, 36, 38 and 40 to define six light conduction paths, so that the optical energy reflected by the rod end 10a may be always introduced into any of them in any possible orientation of the rod end 10a. In this construction, no substantial loss due to leakage develops even if the rod 10 is rotated continuously. Therefore, such a distributor arrangement features a wide variety of applications such as ordinary lighting and cultivation of chlorella, in which case the rod 10 will be rotated at a high speed to steer the optical energy sequentially into the rods 30–40.

If desired, the optical energy conducted by the second rod 12 or 14 shown in FIGS. 1 and 2 may be supplied to the first rod 10 shown in FIGS. 3 and 4. Likewise, optical energy propagating through any of the second light conducting rods may be used as a light source for a first light conducting rod of another light distributor.

Figure 5:
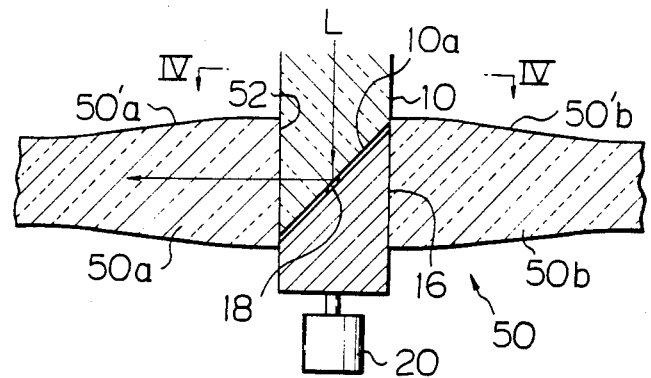
FIG. 5 is a fragmentary sectional view of another embodiment of the present invention taken along line V—V of FIG. 6.
Figure 6:
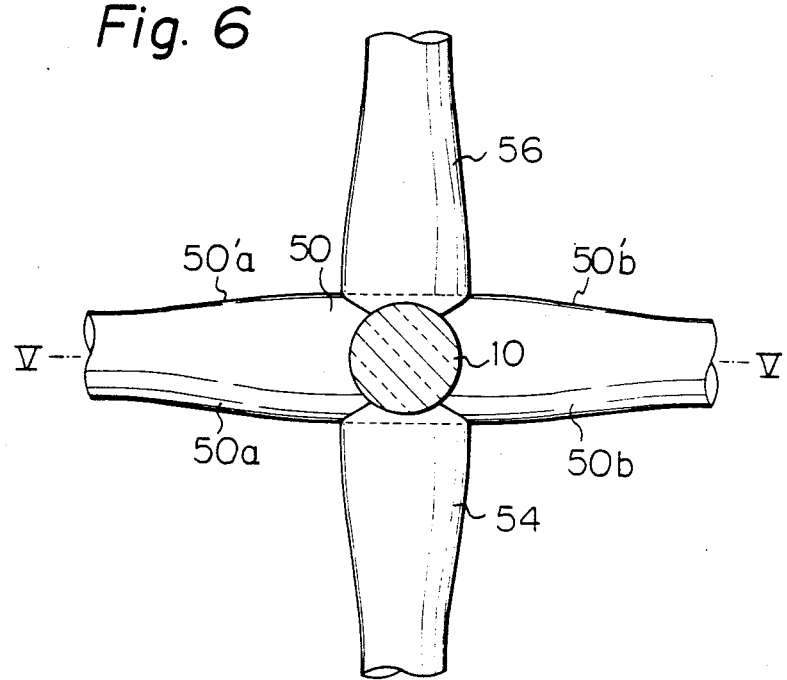
FIG. 6 is a partly sectional plan view of the apparatus of FIG. 5 as seen in a direction VI—VI of FIG. 5.

Referring to FIGS. 5 and 6, another embodiment of the present invention is shown. The light distributor in accordance with this embodiment comprises a second light conducting rod 50 which is larger in diameter than the first light conducting rod 10. The rod 50 is formed with a through bore 52 for receiving the first rod 10; the portions of the rod 50 at opposite sides of the bore 52 are designated by 50a and 50b, respectively. An advantage attainable with such a configuration is that an opening for receiving the first rod 10 can be readily formed using a single member.

In FIGS. 5 and 6, the opposite portions 50a and 50b of the second rod 50 are tapered as at 50a' and 50b' respectively. This causes the optical energy to be converged during its propagation through the rod 50 so as to set up a larger optical energy density, while increasing the numerical aperture (NA) of the apparatus. Other second light conducting rods 54 and 56 may be employed together with the second light conducting rod 50. If desired, the portions 50'a and 50'b described as being tapered may be flared to reduce the optical energy density toward the ends.

Figure 7:
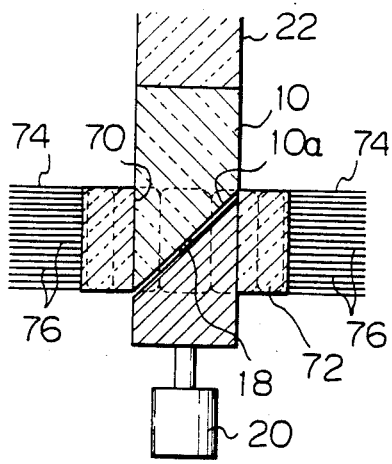
FIG. 7 is a section of another embodiment of the present invention taken along line VII—VII of FIG. 8.
Figure 8:
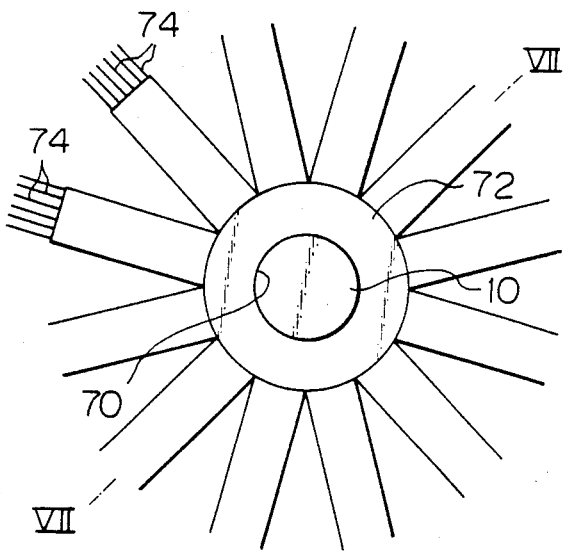
FIG. 8 is a plan view of the apparatus of FIG. 7.
Figure 9:
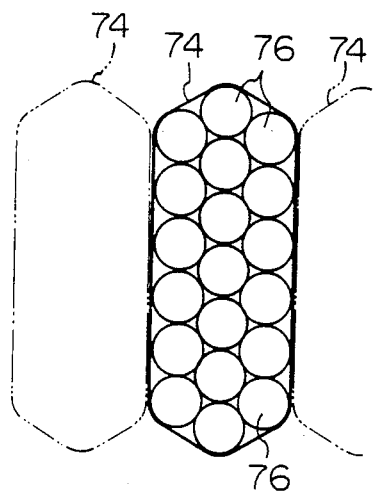
FIG. 9 is a section of a fiber optic cable applicable to the construction shown in FIG. 7.

Referring to FIGS. 7-9, another embodiment of the present invention is shown. In this embodiment, the first light conducting rod 10 is passed through a circular opening 70 formed in a light conducting disc 72. Arranged around the disc 72 are a plurality of flat light conducting cables, or fiber optic cables, 74 each of which comprises numerous optical fibers 76 in a flat bundle as best shown in FIG. 9. The end of each cable 74 facing the outer periphery of the disc 72 is oriented longer in the axial direction than in the circumferential direction of the disc 72. In this construction, as the inclined reflecting end of the first rod 10 is angularly moved about its axis, the optical energy propagating therethrough is sequentially introduced into the cables 74 through the disc 72. Again, any desired rate of movement may be selected for the first rod 10 depending upon the desired application of the light distributor.

Figures 10A, 10B, 10C:
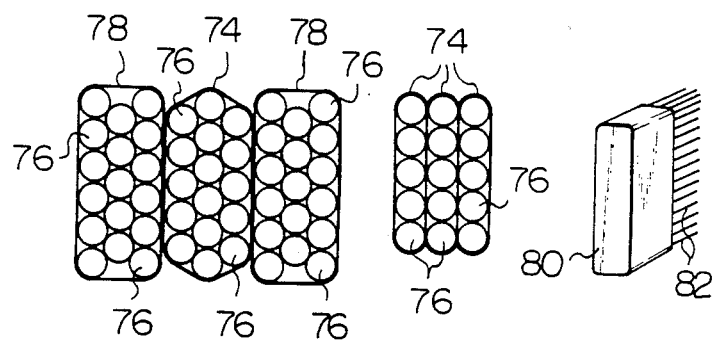
FIGS. 10A–10C are views of other fiber optic cables applicable to the construction of FIG. 7.

Other possible configurations of the flat fiber optic cables are shown in FIGS. 10A-10C. In FIG. 10A, the cables 74 shown in FIGS. 7-9 each having a convex configuration alternate with cables 78 each having a concave configuration. In FIG. 10B, each of the cables 74 comprises a single array of fiber optic cables 76. Further, in FIG. 10C, use is made of a flat light conducting rod 80 and a number of optical fibers 82 the light receiving ends of which are bonded to the light emitting end of the rod 80.

Figure 11:
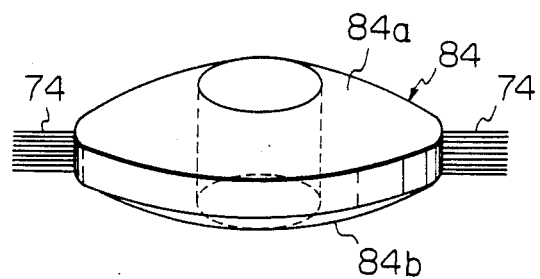
FIG. 11 is a perspective view of a modified disc configuration applicable to the construction of FIG. 7.

A modification to the disc 72 shown in FIGS. 7 and 8 is shown in FIG. 11. The disc, generally 84, is tapered at axially opposite ends thereof as indicated by 84a and 84b, respectively. The tapered disc configuration will increase the available energy density. Alternatively, the disc may be flared at axially opposite ends thereof to reduce the optical density.

Figure 12:
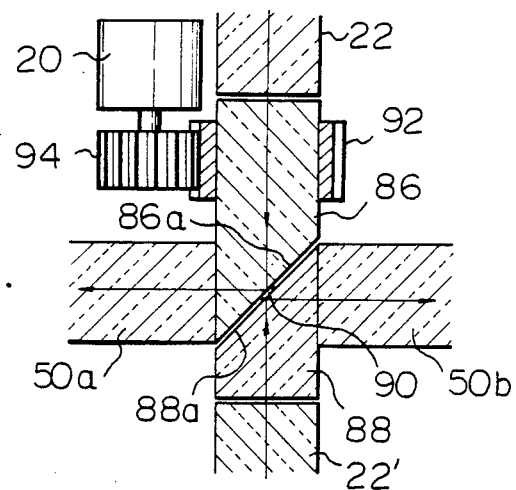
FIG. 12 is a sectional view of another embodiment of the present invention.

Referring to FIG. 12, another embodiment of the present invention is shown which is distinguishable from the foregoing embodiments by its bidirectional light conduction. As shown, two first light conducting rods 86 and 88 are interconnected by a connecting member 90 with their inclined reflecting ends 86a and 88a positioned adjacent and parallel to each other. In this case, optical energy is supplied through the light conducting cable 22 into the rod 86 and through a second light conducting cable 22' into the rod 88. The light reflected by the rod end 86a and the light reflected by the rod end 88a will be routed radially outwardly in opposite directions. The efficiency of time-sharing light distribution attainable with the construction of FIG. 12 is double the efficiency afforded by any of the foregoing constructions.

In FIG. 12, it is necessary to drive the interconnected first rods 86 and 88 by way of intermeshed gear elements 92 and 94. Also, four or more light conduction paths or second rods have to be employed as has been the case with FIGS. 3-11. It will readily occur to those skilled in the art that where four light conduction paths are laid at angular distances of 90 degrees as the light conduction paths 50a', 50b', 54 and 56 of FIGS. 5 and 6, the integral first rods 86 and 88 may be pivotted over an angular range of 90 degrees.

Figure 13:
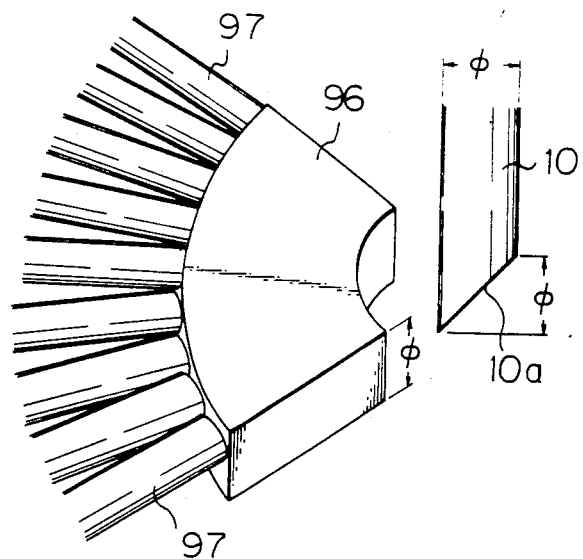
FIG. 13 is a plan view of another embodiment of the present invention.

Referring to FIG. 13, another embodiment of the present invention is shown and comprises a light conducting sector 96 which is formed coaxially with the first light conducting rod 10. The sector 96 has a thickness $\phi$ equal to a diameter of the rod 10. Arranged on the outer periphery of the sector 96 are the light receiving ends of light conducting cables 97 each of which may be substantially identical in diameter with the rod 10. In this construction, moving the inclined reflecting end 10a of the rod 10 over the angular range of the sector 96 will route the light from the rod end 10a sequentially into the light conducting cables 97. It will be noted in FIG. 13 that the light conducting cables 97 having a diameter substantially equal to that of the rod 10 may be replaced by one such as shown in FIG. 9 or any of FIGS. 10A-10C, or by numerous optical fibers the light receiving ends of which are directly bonded to the sector 96.

Figure 14:
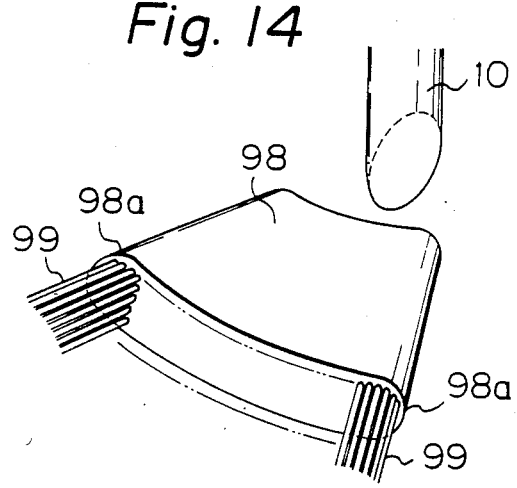
FIG. 14 is a view of a modification to the embodiment shown in FIG. 13.

A modification to the arrangement of FIG. 13 is shown in FIG. 14. The modified sector 98 is rounded or formed semicircularly at opposite side edges thereof as at 98a. This allows the edges of the sector 98 to be aligned with the contour of the optical energy which is reflected by the rod end 10a, thereby promoting more effective use of the optical energy. Additionally, the semicircular edge configuration shown in FIG. 14 is successful to reduce leakage of light from the edges where the major surfaces of the sector merge into the side surfaces.

In FIG. 14, while a number of optical fibers 99 are shown as being arranged on the outer periphery of the sector 98, fiber optic cables such as shown in FIG. 13 may be employed instead. Further, any of such configurations may be used in combination with the configuration shown in any of FIGS. 9 and 10A-10C.

Reference will be made to FIGS. 15-21 for describing other embodiments of the present invention which distribute optical energy directly to the ambience without the intermediary of light conduction paths such as those defined by the rods or the cables. In FIGS. 15-21, the same or similar structural elements are designated by like reference numerals.

Figure 15:
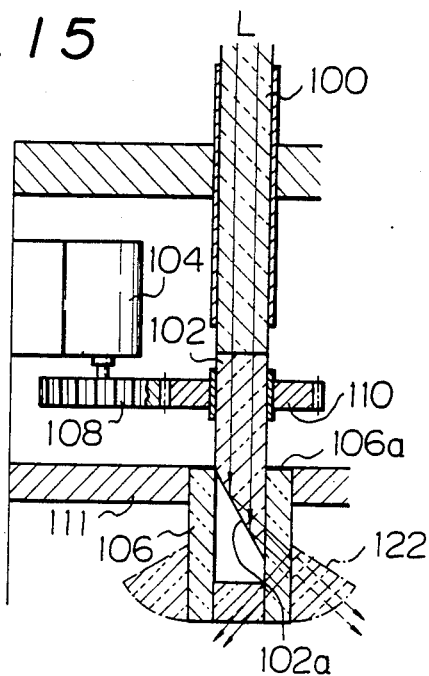
FIGS. 15–21 are sections of other various embodiments of the present invention.

Referring to FIG. 15, a light conducting cable, or fiber optic cable, 100 conducts converged optical energy to a cylindrical light conducting rod 102 in the manner described in conjunction with the preceding embodiments. The lower end of the rod 102 is cut aslant to form a reflecting surface 102a. A drive unit 104 is mounted on a rigid member in order to drive the rod 102 for rotation. A tubular member 106 having a circular cross-section is adapted to protect the inclined reflecting end of the rod 102 from dust and the like. The optical energy L propagating through the cable 100 is introduced into the rod 102 to be steered by the inclined rod end 102a to the outside of the rod 102. The rod 102 is held rotatable relative to the cable 100 and the tube, or sheath, 106 by optical oil or the like.

In operation, the drive unit 104 such as a motor is energized to rotate the rod 102 about its axis by way of intermeshed gear elements 108 and 110. While the optical energy L introduced into the rod 102 in the manner described is discharged to the outside of the rod 102 by the inclined rod end 102a, the direction of light emission changes every moment due to the rotation of the rod 102. Stated another way, any specific object located in the neighborhood of the light distributor is irradiated a moment once for each rotation of the rod 102. The period of irradiation is controllable in accordance with a desired application by varying the rotation speed of the rod 102.

In FIG. 15, the rod 102 is designed to rotate within the transparent, hollow cylindrical member 106. This insures stable rotation of the rod 102, and keeps the reflecting end 102a from sources of contamination and damage. In this instance, the upper end of the cylinder 106 adjacent to the light receiving end of the rod 102 may be finished as a reflecting surface 106a in order to steer upwardly reflected light downwardly. This will prove desirable when the light distributor is secured to a ceiling 111, for example.

Figure 16:
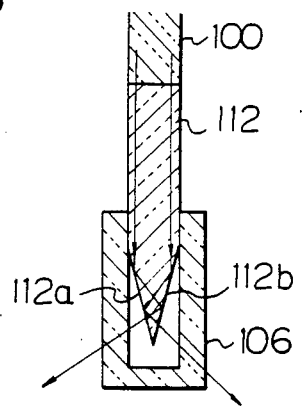

A modified rod end configuration is shown in FIG. 16. As shown, the modified rod 112 has a generally wedge-shaped end which is defined by a pair of inclined reflecting surfaces 112a and 112b. Such a configuration is effective to implement a wider range of lighting because the light propagating through the rod 112 is repeatedly reflected by the inclined surfaces 112a and 112b to increase NA.

Figure 17:
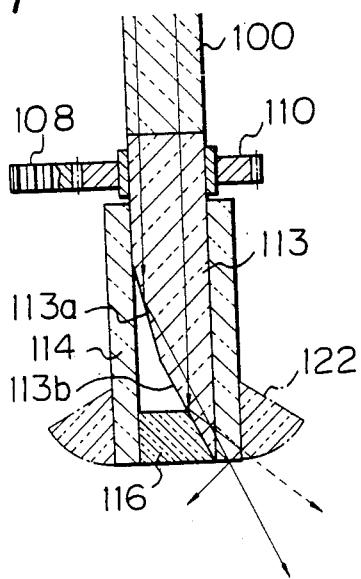

Another embodiment of the present invention is shown in FIG. 17. As shown, a light conducting rod 113 has a plurality of inclined reflecting surfaces which are different in inclination angle from each other, reflecting surfaces 113a and 113b in this particular embodiment. Any desired number of such reflecting surfaces and their inclination angles are selectable to set up a specific light distribution curve. The rod 113 is rotatable within a transparent tubular member 114 and carries therewith a closure member 116 adapted to close the lower end of the tubular member 114. This will add to the stability of rotation of the rod 113.

Figure 18:
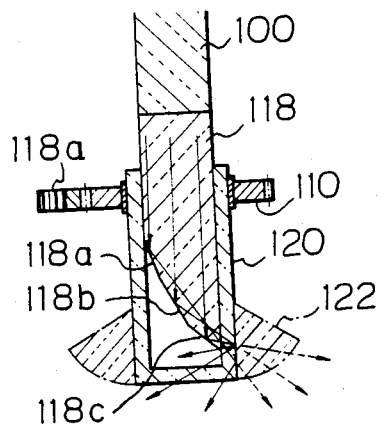

Referring to FIG. 18, another embodiment of the present invention is shown. A light conducting rod 118 in this embodiment is formed with three inclined light reflecting surfaces 118a, 118b and 118c whose inclination angles are different from each other. A transparent tubular covering or sheath 120 confines the reflecting end of the rod 118 and is formed integrally therewith. With this construction, the light distributor allows the rod 118 to rotate in a further stable manner due to the rigid connection of the rod 118 and sheath 120, while promoting more effective emission of the optical energy reflected by the reflecting surfaces 118a, 118b and 118c.

In the embodiments described above with reference to FIGS. 15-18, the tube or sheath 106, 114 or 120 may be made of a light diffusing material to render light tender to the eyes. Also, an annular protuberance 122 having a generally triangular cross-section may be located on a lower portion of the outer periphery of the tube or sheath to project radially outwardly thereof.

Figure 19:
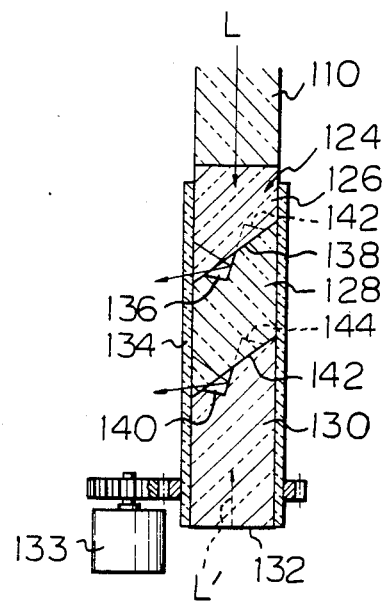

Referring to FIG. 19, another embodiment of the present invention is shown and includes a light conducting rod assembly generally designated by the reference numeral 124. The assembly 124 is made up of rods 126, 128 and 130 which are interconnected end-to-end with each other. A mirror 132 is mounted on an end of the assembly 124 which is remote from the cable 100. The rod assembly 124 is driven in a rotational motion by a drive unit 133 through intermeshed gears (no numeral). A transparent, tubular member 134 surrounds the assembly 124 to cause it to rotate with stability. A light diffusing chamber 136 is defined at the interface 138 between the rods 126 and 128, and a light diffusing chamber 140 at the interface 142 between the rods 128 and 130. If desired, a plurality of light diffusing chambers may be formed at each interface. The illustrated configuration of each light diffusing chamber is not limitative and may be replaced by any other desired one. Further, the interfaces 138 and 142 may be inclined in different directions or may even be formed flat.

In the construction shown in FIG. 19, the optical energy introduced from the cable 100 into the rod assembly 124 propagates therethrough to be reflected by the walls of the chambers 136 and 140. The reflected optical energy is emitted to the ambience out of the rod assembly 124 via the transparent tube 134, while the rest of the optical energy is reflected by the mirror 132 to propagate through the assembly 124 backward and, thereby, steered by the walls of the chambers 136 and 140 in the manner described. Because the rod assembly 124 continuously rotates driven by the drive unit 133, an object adjacent to the light distributor is illuminated a moment once for each rotation of the rod assembly 124. Such repeated momentary supply of optical energy promotes efficient use thereof. The period of illumination is freely selectable depending upon the application by varying the rotation speed of the assembly 124.

Also formed in the rod assembly 124 of FIG. 19 are light diffusing chambers 142 and 144 which are indicated by dotted lines in the drawing and adapted to steer light L' reflected by the mirror 132. However, these chambers 142 and 144 are not essential because the walls of the chambers 136 and 140 will serve to steer such light L' as well as the light L.

The transparent tube 134 not only insures stable rotation of the rod assembly 124 but protects the outer periphery of the rod assembly 124 from damage and contamination, such as deposition of dust. Naturally, in the illustrated arrangement, the tube 134 may be damaged or may gather dust on its outer periphery. However, where the rod assembly 124 is made of silica having a high transmittance, the tube 134 may be economically changed when damaged or easily cleaned when gathered dust if it comprises a thin inner layer of silica and an outer layer of inexpensive acrylic resin. Optical oil or the like may be applied to between the rod assembly 124 and the rube 134 in order to effect smooth rotation of the rod assembly 124.

The applicant has proposed a photoradiator which radiates optical energy propagating through a cylindrical light conducting member radially outwardly of the light conductor and in a desired intensity distribution (see Japanese patent application No. 57-148314/1982) which corresponds to U.S. Pat. No. 4,585,298, filed Apr. 29, 1986. Such a concept is applicable to the light distributor shown in FIG. 19. For example, assuming that the chamber 136 at the interface 138 discharges a quantity $S_1$ of the light L and a quantity $S'_1$ of the light L', and the chamber 140 at the interface 142 a quantity $S_2$ of the light L and a quantity $S'_2$ of the light L', any desired relation between $(S_1+S'_1)$ and $(S_2+S'_2)$ is selectable by selecting light receiving areas of the chambers 136 and 140 accordingly. It should be noted that the number of interfaces in the rod assembly 124 is not limited to two but may be three or more.

Figure 20:
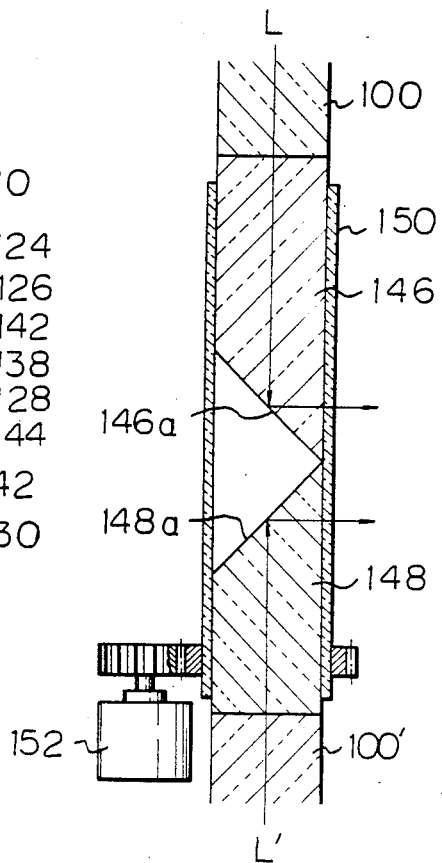

Referring to FIG. 20, another embodiment of the present invention is shown. The light distributor comprises a first light conducting rod 146 connecting to the light conducting cable 100 and a second light conducting rod 148 connecting to a second light conducting cable 100'. The two rods 146 and 148 are integrally retained by a transparent tubular member 150. The integral rod assembly is caused into rotation by a drive unit 152 through intermeshed gears (no numeral). The rod 146 has an inclined reflecting end 146a and the rod 148, an inclined reflecting end 148a which faces the reflecting end 146a. The reflecting end 146a will reflect optical energy L supplied from the cable 100 to the ambience, while the reflecting end 148a will reflect optical energy $L_1$ supplied from the cable 100'.

Figures 21, 22:
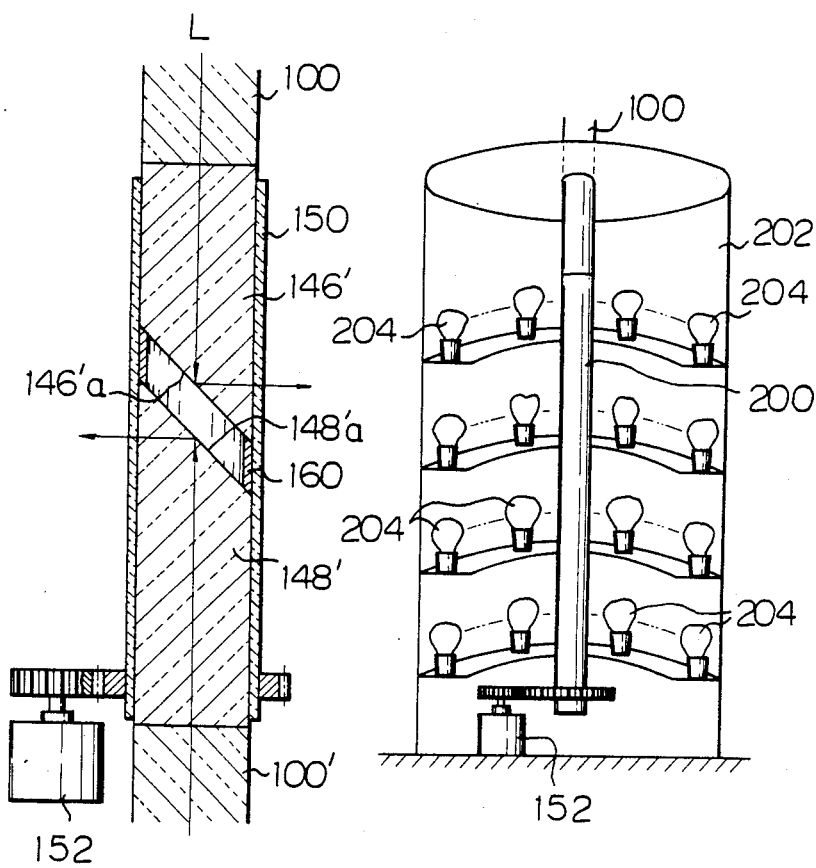
FIGS. 22 and 23 are schematic views of exemplary applications of any of the apparatuses shown in FIGS. 19–21.

A modification to the light distributor of FIG. 20 is shown in FIG. 21. The modified light distributor has light conducting rods 146' and 148' arranged such that their inclined reflecting surfaces 146'a and 148'a are positioned parallel to each other by a spacer 160. In this construction, the light L from the cable 100 and the light $L_1$ from the cable 100' will be steered in opposite directions radially outwardly of the light distributor.

Referring to FIG. 22, an exemplary application of the light distributor shown in any of FIGS. 19–21 is shown. The light distributor is designated by the reference numeral 200 and disposed in a generally cylindrical plant growing chamber 202. As shown, plants 204 are arranged along the inner periphery of the chamber 202, while the light distributor 200 is rotated in the previously described manner to illuminate each of the plants 204 for a moment once for every rotation thereof. This will cause photosynthetic reactions to effectively occur for the reasons described.

Figure 23:
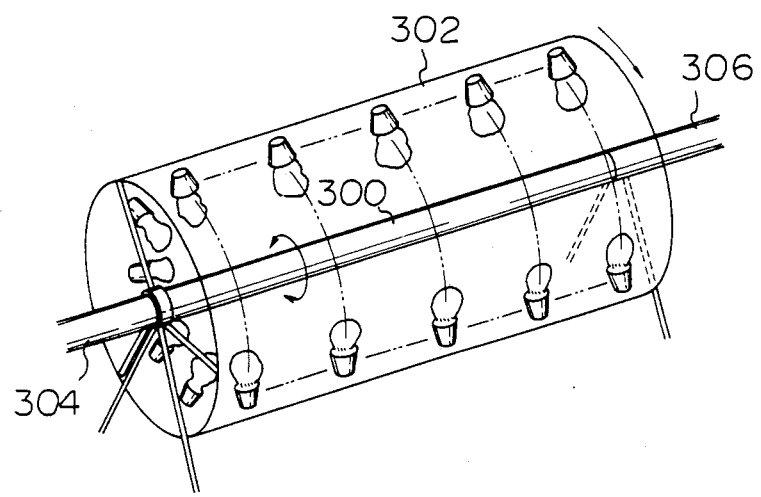

Another application of the light distributor of the type shown in any of FIGS. 19–21 is shown in FIG. 23. The light distributor 300 is located in a cylindrical plant growing chamber 302 and connected to light conducting cables 304 and 306 at opposite ends thereof. Plants (no numeral) are arranged along the inner wall of the chamber 302. This application is intended for use in the outer space and, therefore, the chamber 302 is bodily rotated as illustrated to apply gravity to the plants.

For ordinary lighting applications, on the other hand, the light diffusing chambers or the surface of the cylindrical tube may be finished to light diffusing surfaces to set up soft illumination.

In summary, it will be seen that the present invention provides a time-sharing light distribution apparatus which is capable of effectively distributing optical energy by means of a simple and economical construction, thereby realizing effective use of optical energy. Additionally, the apparatus of the invention is free from generation of heat or electrical leak.

Various modifications will become possible for those skilled in the art after receiving the teachings of the present disclosure without departing from the scope thereof.

What is claimed is:

1. An apparatus for distributing optical energy supplied from a single source of optical energy supply to a plurality of locations on a time-sharing basis, comprising:
    a cylindrical and rotatable light conducting rod assembly for receiving the optical energy at one end thereof and having a mirror mounted at the other end to reflect the optical energy; and
    drive means for rotating said light conducting rod assembly about an axis thereof;
    said light conducting rod assembly comprising a plurality of rods which are connected end-to-end with each other, adjacent ones of said rods defining a light diffusing chamber at an interface thereof which is inclined with respect to a plane which is perpendicular to an axis of the light conducting rod.

2. An apparatus as claimed in claim 1, in which the light conducting rod assembly includes a plurality of interfaces between the rods which are different in orientation from each other.

3. An apparatus as claimed in claim 1, in which the light diffusing chamber is defined by light diffusing reflective walls.

4. An apparatus as claimed in claim 1, further comprising a tubular transparent sheath member in which the interconnected rods are rotatably received.

5. An apparatus as claimed in claim 4, in which the tubular sheath is made of a light diffusing material.

6. An apparatus as claimed in claim 1, in which light receiving areas of the light diffusing chambers at the respective interfaces are predetermined such that a sum of an amount $S_1$ of light introduced into the light conducting rod from said one end and discharged therefrom and an amount $S'_1$ of light reflected by the mirror and discharged from the light conducting rod, $S_1 + S'_1$, has a predetermined distribution.

7. An apparatus for distributing optical energy supplied from a single source of optical energy supply to a plurality of locations on a time-sharing basis, comprising;
    a cylindrical and rotatable light conducting rod for receiving the optical energy at one end there of and inclined at the other end to reflect the optical energy, said other or inclined end of said light conducting rod comprising a plurality of contiguous surfaces which are different in inclination angle from each other;
    drive means for causing said light conducting rod to rotate about an axis thereof;
    a transparent tubular member in which said other or inclined end of the light conducting rod is rotatably received; and
    a closure member integrally mounted on the light receiving end of the rod in such a manner as to close an end of the tubular member.

8. An apparatus for distributing optical energy supplied from a single source of optical energy supply to a plurality of locations on a time-sharing basis, comprising:
    a first cylindrical and rotatable light conducting rod means comprising a first light conducting rod for receiving optical energy at one end thereof and inclined at the other end with respect to a plane perpendicular to the longitudinal axis of said first light conductor rod to reflect optical energy perpendicularly to said longitudinal axis along which the optical energy propagates;
    drive means for causing said first light conducting rod to rotate about said longitudinal axis; and
    second light conducting rod means comprising at least one second light conducting rod, said second light conducting rod having a longitudinal axis and a through-bore having a through-bore axis which is perpendicular to the longitudinal axis of the second rod, said first rod being rotatably received in said through-bore as the longitudinal axis of said first rod and the through-bore axis intersect one another at right angles, said second rod having two axially aligned sections with one section having a first through-bore defining end defining a portion of said through-bore and the other section having a second through-bore defining end defining another portion of said through-bore, whereby rotation of said first rod by said drive means results in optical energy being transmitted from said inclined end of said first rod into either of said first or second through-bore defining ends into the respective second rod sections, the disposition of said first rod in said through-bore providing stable rotation of said first rod while allowing a minimum of light loss due to leakage.

9. An apparatus as claimed in claim 8 in which said second light conducting rod means comprises a third light conducting rod, said third light conducting rod having a longitudinal axis and another through-bore having a through-bore axis which is perpendicular to the longitudinal axis of the third rod, said first rod being rotatably received in said other through-bore such that the longitudinal axis of said first rod and the through-bore axis of said other through-bore intersect one another at right angles, said third rod having third and fourth through-bore defining ends defining portions of said other through-bore, whereby rotation of said first rod by said drive means causes optical energy to be transmitted from said inclined end of said first rod into either of said third and fourth through-bore defining ends into said third rod.

10. An apparatus as claimed in claim 8, wherein at least one of said sections of said second rod has a tapering portion in which the diameter of the second rod progressively increases as said first rod is approached, whereby the optical ene gy is converged during propagation through said tapered portions so as to provide a larger optical density.

11. An apparatus as claimed in claim 8, wherein said first rod means further comprises a third light conducting rod axially alinged with said first rod, said first and third rods having the same diameter, said third rod being inclined at one end with respect to a plane perpendicular to the axis of said third rod, said third rod being rotatably received in said through-bore such that the inclined end of said third rod is disposed within said through-bore and is parallel with the inclined end of the first rod, and connecting means connecting said first and third rods.

12. An apparatus according to claim 11, wherein said drive means is connected to said third rod to thereby rotate said third rod and the connected first rod.

13. An apparatus according to claim 11, wherein said first rod means further comprises a fourth light conducting rod axially aligned with and juxtaposed to said first rod, said first rod means further comprising a fifth light conducting rod axially aligned with and juxtaposed to said third rod, and operable means operably connecting said drive means to said first rod for rotating said first and third rods, whereby optical energy is supplied through said fourth rod to said axially aligned first rod and reflected by the inclined end of said first rod radially outwardly in a first direction to said second rod means, and optical energy is further supplied through said fifth rod to said axially aligned third rod and reflected by said inclined end of said third rod radially outwardly in a second direction to said second rod means, said first direction being opposite to said second direction.

14. An apparatus for distributing optical energy supplied from a single source of optical energy supply to a plurality of locations on a time-sharing basis, comprising:
a first cylindrical and rotatably light conducting rod means comprising a first light conducting rod for receiving optical energy at one end thereof and inclined at the other end with respect to a plane perpendicular to the longitudinal axis of said first light conductor rod to reflect optical energy perpendicularly to said longitudinal axis along which the optical energy propagates;
drive means for causing said first light conducting rod to rotate about said longitudinal axis;
a light conducting disc means having an axial opening, said first rod being rotatably received in said axial opening with said inclined end of said first rod being disposed within said axial opening; and
second light conducting means located about said disc means and having longitudinal axes extending radially of said disc means, said second light conducting means comprising light conducting cables having end portions which are disposed side-by-side in abutting relationship, said light conducting cables having longitudinal end faces juxtaposed to said end portions disposed against the outer circumferential surface of said disc means, whereby optical energy reflected by said inclined end of said first rod is transmitted through said disc means to said second light conducting means successively as said drive means rotates said first rod.

15. An apparatus according to claim 14, wherein each of said second light conducting cables comprises a plurality of optical fibers formed in a flat bundle with the height of said bundle in a first direction parallel to the axis of the axial opening in said disc means being greater than the transverse width perpendicular to said first direction.

16. An apparatus according to claim 14, wherein said disc means comprises a disc member having an outer periphery, said disc member having opposed end faces extending between said outer periphery and the periphery of said axial opening in said disc means, said disc member being tapered such that the axial distance between the opposed end faces at said outer periphery is less than the axial distance between said opposed end faces at said periphery of said axial opening.

17. An apparatus according to claim 14, wherein said disc means comprises a disc section having an axial thickness equal to the diameter of said first light conducting rod.

18. An apparatus for distributing optical energy supplied from a single source of optical energy supply to the ambient area, comprising:
a cylindrical and rotatable light conducting rod for receiving optical energy at one end thereof and having inclined means at the other end to reflect the optical energy, said inclined means comprising a plurality of contiguous surfaces which are different in inclination angle from each other;
drive means for causing said light conducting rod to rotate about an axis thereof; and
a sealed transparent sheath member closed at one longitudinal end and rotatably receiving said rod at the other longitudinal end such that the inclined means is thereby disposed within said sheath member sealed and protected from the ambient dust and the like, said sheath member having a lower portion which is bulged radially outwardly in a substantially triangular cross-section, whereby optical energy reflected by said inclined means is transmitted through successive parts of said sheath member to the surrounding ambient area as said drive means rotates said light conducting rod.

19. An apparatus according to claim 18, wherein said sheath member has an upper longitudinal end with a reflecting means in order to redirect and reflect upwardly directed light downwardly.

20. An apparatus according to claim 18, wherein said sheath member is made of a light diffusing material.

21. An apparatus according to claim 18, wherein said inclined means is wedge-shaped with two of said contiguous surfaces approaching one another as said other end of said light conducting rod is approached.

* * * * *